US00RE40210E

(19) United States
(12) Reissued Patent
Murata

(10) Patent Number: US RE40,210 E
(45) Date of Reissued Patent: Apr. 1, 2008

(54) DIGITAL RADIO TELEPHONE FOR A DIGITAL MOBILE RADIO COMMUNICATION SYSTEM

(75) Inventor: Takashi Murata, Tokyo (JP)

(73) Assignee: Mitsubishi Denki Kabushiki Kaisha, Tokyo (JP)

(21) Appl. No.: 11/502,579

(22) Filed: Aug. 11, 2006

Related U.S. Patent Documents

Reissue of:
(64) Patent No.: 6,285,872
Issued: Sep. 4, 2001
Appl. No.: 09/535,804
Filed: Mar. 28, 2000

U.S. Applications:
(62) Division of application No. 10/653,747, filed on Sep. 3, 2003, which is a division of application No. 08/728,359, filed on Oct. 9, 1996, now Pat. No. 6,075,984.

(30) Foreign Application Priority Data

Feb. 29, 1996 (JP) ..... 8-43510

(51) Int. Cl.
*H04Q 7/32* (2006.01)
*H04M 3/487* (2006.01)

(52) U.S. Cl. ..... 455/415
(58) Field of Classification Search ..... 455/412.1, 455/412.2, 415, 460; 379/142.11, 142.17
See application file for complete search history.

(56) References Cited

U.S. PATENT DOCUMENTS 5,251,250 A 10/1993 Obata et al. ..... 455/412.1
5,363,429 A 11/1994 Fujisawa et al. ..... 455/415
5,398,279 A 3/1995 Frain et al. ..... 379/142.11
5,559,860 A 9/1996 Mizikovsky ..... 455/415

FOREIGN PATENT DOCUMENTS

| | | |
|---|---|---|
| JP | 62-204631 | 9/1987 |
| JP | 1-109851 | 4/1989 |
| JP | 3-85848 | 4/1991 |
| JP | 3-112245 | 5/1991 |
| JP | 4-560 | 1/1992 |
| JP | 4-68741 | 3/1992 |
| JP | 4-306038 | 10/1992 |
| JP | 5-14274 | 1/1993 |
| JP | 5-41735 | 2/1993 |
| JP | 5-91180 | 4/1993 |
| JP | 5-103076 | 4/1993 |
| JP | 6-62108 | 3/1994 |

*Primary Examiner*—Willis R. Wolfe, Jr.
(74) *Attorney, Agent, or Firm*—Oblon, Spivak, McClelland, Maier & Neustadt, P.C.

(57) ABSTRACT

A digital radio telephone comprises a radio portion for receiving a radio signal modulated by an encoded digital signal including control information, for demodulating and outputting the encoded digital signal, a control signal processing portion for decoding the demodulated encoded digital signal to obtain the control information, a telephone number information detecting means for detecting whether the decoded control information includes mate telephone number information, a memory for storing the telephone number information, a time information management means for specifying an incoming time of the telephone number information to output a time information, and a memory management means for recording the telephone number information corresponding to the time information into the memory.

7 Claims, 9 Drawing Sheets

121

| ADDRESS 1 | INCOMING TELEPHONE NUMBER 1 | INCOMING TIME 1 |
|---|---|---|
| ADDRESS 2 | INCOMING TELEPHONE NUMBER 2 | INCOMING TIME 2 |
| ADDRESS 3 | INCOMING TELEPHONE NUMBER 3 | INCOMING TIME 3 |
| . . . . . | . . . . . | . . . . . |

FIG. 5

| ADDRESS 1 | TELEPHONE NUMBER 1 | ABBREVIATION 1 |
|---|---|---|
| ADDRESS 2 | TELEPHONE NUMBER 2 | ABBREVIATION 2 |
| ADDRESS 3 | TELEPHONE NUMBER 3 | ABBREVIATION 3 |
| ⋮ | ⋮ | ⋮ |

DIGITAL RADIO TELEPHONE FOR A DIGITAL MOBILE RADIO COMMUNICATION SYSTEM

Matter enclosed in heavy brackets [ ] appears in the original patent but forms no part of this reissue specification; matter printed in italics indicates the additions made by reissue.

CROSS REFERENCE TO RELATED APPLICATION

[This application is a division of U.S. application Ser. No. 08/728,359, filed Oct. 9, 1996, now U.S. Pat. No. 6,075,984.]

*This is a divisional application of U.S. application Ser. No. 10/653,747 filled on Sep. 3, 2003, still pending, which is a reissue of U.S. Pat. No. 6,285,872 issued on Sep. 4, 2001, which is a divisional of U.S. Pat. No. 6,075,984 issued on Jun. 13, 2000, all which claim priority to Japanese Patent Application No. 8-43510 filed on Feb. 29, 1996. The content of each of these documents is incorporated by reference.*

*More than one reissue application has been filed for the reissue of U.S. Pat. No. 6,285,872. The reissue applications are: U.S. application Ser. No. 10/980,695, filled Oct. 31, 200, still pending, U.S. application Ser. No. 11/980,694, filled Oct. 31, 2007, U.S. application Ser. No. 10/653,747 filled on Sep. 3, 2003, still pending. U.S. application Ser. No. 11/502,579 filled on Aug. 11, 2006, still pending, and U.S. application Ser. No. 11/589,954 filled on Oct. 31, 2006, still pending.*

BACKGROUND OF THE INVENTION

1. Field of the Invention

The invention relates to a digital radio telephone used in a digital mobile radio communication system such as a land mobile/portable phone system and a PHS (Personal Handyphone System) adopting a digital telephone system for example. The invention particularly relates to a digital radio telephone having a function of storing a mate telephone number (hereinafter, referred to as "incoming telephone number") and a function of calling the stored phone number (hereinafter, referred to as "incoming redialing function").

2. Description of the Prior Art

FIG. 11 shows a system configuration of an analog radio telephone having a conventional incoming redialing function disclosed in a laid-open Japanese patent publication No. 5-14274. This type of conventional telephone receives mate telephone number information of an incoming call together with an analog audio signal via a radio channel using a communication channel in a form of a DTMF (Dual Tone Multi Frequency) signal where a plurality of frequency signals are superposed, and then, stores the telephone number information in a memory.

An operation of the incoming redialing function of the analog radio telephone is explained below. First, a radio signal containing control information received via an antenna 6 using a control channel is demodulated by a radio portion 5 and outputted as a control signal which is an analog signal in a base band. Control information in the demodulated control signal is decoded by a decoder 15 and is processed by a microcomputer 10 to establish the radio communication channel. Then, a radio signal containing the telephone number information received via the antenna 6 using the communication channel is demodulated by the radio portion 5 and outputted as the DTMF signal which is the analog signal in 9 base band. The telephone number information in the demodulated DTMF signal is detected, judged, and decoded by a DTMF receiver 16. Then, the output receiver 16 from the DTMF signal is processed by the microcomputer 10 and stored in a memory 12. On the other hand, in case of calling by redialing, the telephone number information stored in advance in the memory 12 by the microcomputer 10 is read out, encoded by an encoder 17, modulated by the radio portion 5, then, transmitted from the antenna 6 as a radio signal.

Since the incoming redialing function in the conventional analog radio telephone constructed as explained above requires the DTMF receiver for detecting the telephone number information in addition to the construction for operating the telephone function itself, there is a problem that the conventional analog radio telephone construction is complicated. Also, since the conventional analog radio telephone redials using the telephone number information stored only in the memory, it is difficult to provide an incoming redialing function having high-performance or multifunction in consideration of user service.

It is an object of the present invention to provide a digital radio telephone having a high-performance incoming redialing function by maximally using the digital processing ability naturally included in a digital radio telephone.

SUMMARY OF THE INVENTION

According to one aspect of the invention, a digital radio telephone comprises a radio portion for receiving a radio signal modulated by an encoded digital signal including control information, for demodulating and outputting the encoded digital signal; a control signal processing portion for decoding the demodulated encoded digital signal to obtain the control information; a telephone number information detecting means of detecting whether the decoded control information includes mate telephone number information; a memory for storing the telephone number information; a time information management means for specifying an incoming time of the telephone number information to output a time information; and a memory management means for recording the telephone number information corresponding to the time information into the memory.

According to another aspect of the invention, a digital radio telephone used for an external line and an extension line further comprises an extension/external line judging means for judging whether the telephone number information is from the extension or from the external line; an external line information addition means for adding an external line calling information to the telephone number information according to a judging result to output as new telephone number information.

Preferably, the memory management means in the digital radio telephone records a predetermined number of telephone number information in the memory starting with telephone number information received most recently.

According to further aspect of the invention, a digital radio telephone further comprises an operating portion for supplying an operating signal, and a display portion for displaying various information during operation, wherein, the memory comprises a first memory portion for storing the telephone number information included in the control information and a second memory portion for registering other telephone numbers information inputted from the operating portion corresponding identification information to the telephone numbers; and the operating portion instructs the display portion to display the telephone number information recorded in the first memory portion together with the corresponding identification information recorded in the second memory portion.

According to further aspect of the invention, a digital radio telephone further comprises an operating portion for supplying an operating signal, a display portion for displaying various information during operation, wherein, the memory comprises a first memory portion for storing the telephone number information included in the control information and a second memory portion for registering other telephone numbers information inputted from the operating portion corresponding identification information to the telephone numbers; and the operating portion instructs the display portion to display the telephone number information recorded in the first memory portion together with the corresponding identification information recorded in the second memory portion.

According to further aspect of the invention, a digital radio telephone further comprises an operating portion for supplying an operating signal, a display portion for displaying various information during operation, wherein, the operating portion instructs the display portion to display the telephone number information one after another in a circulative way starting with telephone number information received most recently.

Preferably, the operating portion in the digital radio telephone instructs to make a calling process according to the telephone number information when predetermined telephone number information recorded in the memory is displayed on the display portion.

Preferably, the memory in the digital radio telephone comprises a first memory portion for storing the telephone number information included in the control information and a second memory portion for registering other telephone numbers information inputted from the operating portion corresponding identification information to the telephone numbers; and the operating portion instructs the second memory portion to register the predetermined telephone number information when the predetermined telephone number information recorded in the first memory portion is displayed on the display portion.

BRIEF DESCRIPTION OF THE DRAWINGS

FIG. 5 is a diagram to explain a storage configuration of the incoming telephone numbers of the present invention.

DETAILED DESCRIPTION OF THE PREFERRED EMBODIMENTS

Embodiment 1.

Figure 1:
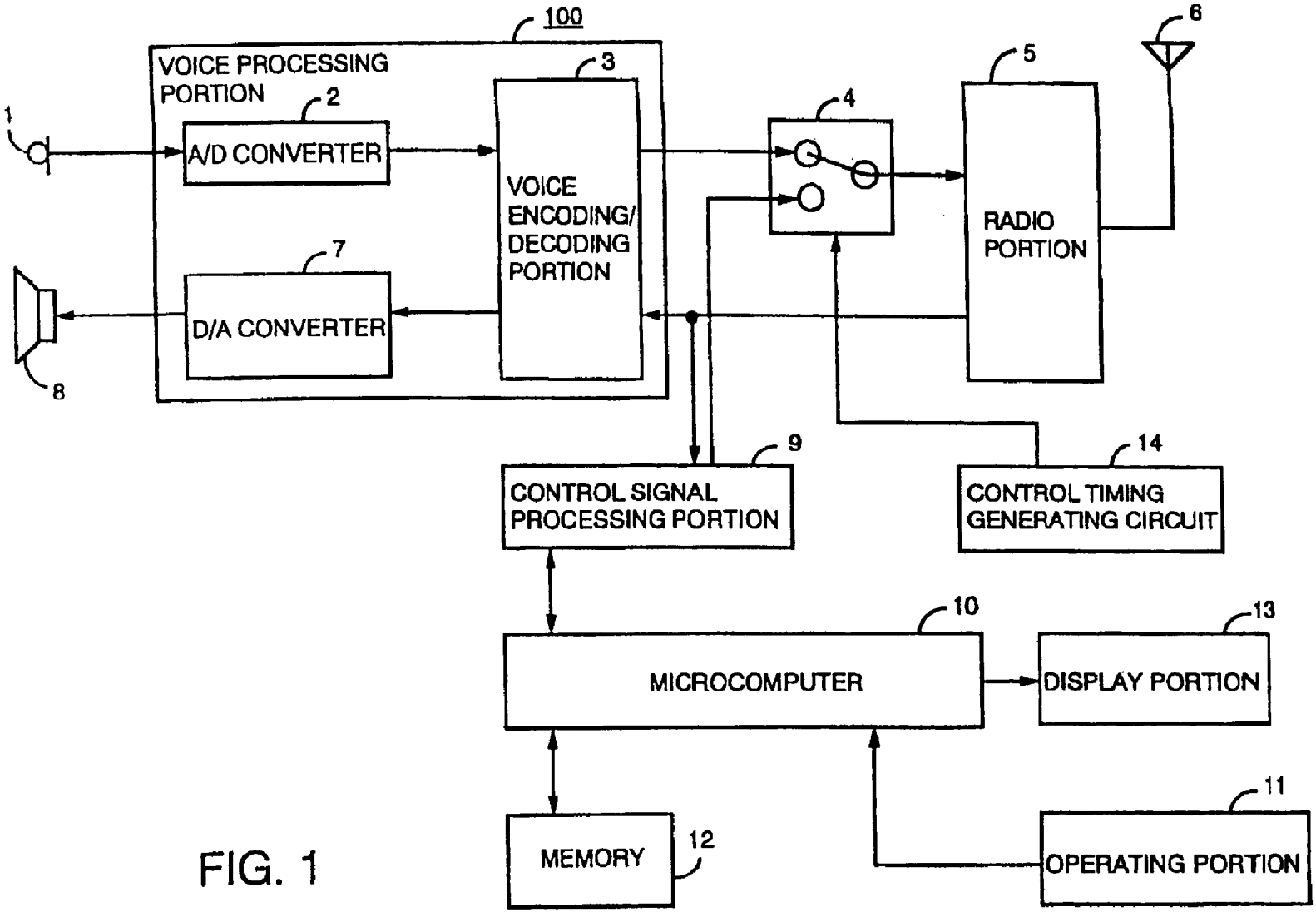
FIG. 1 is a functional block diagram showing a system configuration of a digital radio telephone of an embodiment of the present invention.

The present invention is concretely explained focusing on a digital radio telephone compatible to both a private (extension) line and a public (external) line. FIG. 1 shows a system configuration of the digital radio telephone of an embodiment of the present invention. FIG. 1 comprises a microphone 1 which is used by a user of the digital radio telephone to input audio information such as speech as an analog audio signal, an A/D) converter 2 for converting the inputted analog audio signal into a digital audio signal, a voice encoding/decoding portion 3 for encoding the digital audio signal outputted from the A/D converter 2 using a data compression encoding system such as a VSELP (Vector Sum Excited Linear Predictive Coding) system to obtain an encoded digital signal, and decoding the encoded digital signal in a reverse processor to the encoding to obtain a digital audio signal, a switch 4 for selecting any one of the encoded digital signal from the voice encoding/decoding portion 3 or an encoded digital signal from a control signal processing portion 9 mentioned later, a radio portion 5 having a transmission modulation function for converting the encoded digital signal from the switch 4 into a radio signal transmitted by an antenna 6 and a reception demodulating function for converting the radio signal received by the antenna 6 into an encoded digital signal, a D/A converter 7 for converting the digital audio signal decoded by the voice encoding/decoding portion 3 into an analog audio signal, a speaker 8 for outputting the audio information as the analog audio signal, a control signal processing portion 9 for decoding a control information included in the encoded digital signal from the radio portion 5, and for encoding telephone number information stored in a memory 12 mentioned later, and outputting the telephone number information to the switch 4 as an encoded digital signal, a microcomputer 10 for recording the telephone number information included in the control information from the control signal processing portion 9 in the memory 12 according to the time when the information is received and for processing the telephone number information stored in the memory 12 in order to display it on the display portion 13 mentioned later by an operating portion 11, an operating portion 11 for reading the telephone number information out of the memory 12 for example and for inputting an operating information such as carrying out calling as an operating signal, a memory 12 for storing the telephone number information processed by the microcomputer 10 as an incoming record information, a display portion 13 for displaying a message in response to the operating information and various operations, and a control timing generating circuit 14 for controlling switching timing of the switch 4. FIG. 1 also comprises a voice processing portion 100 which comprises the A/D converter 2, the voice encoding/decoding portion 3, and the D/A converter 7.

Figure 2:
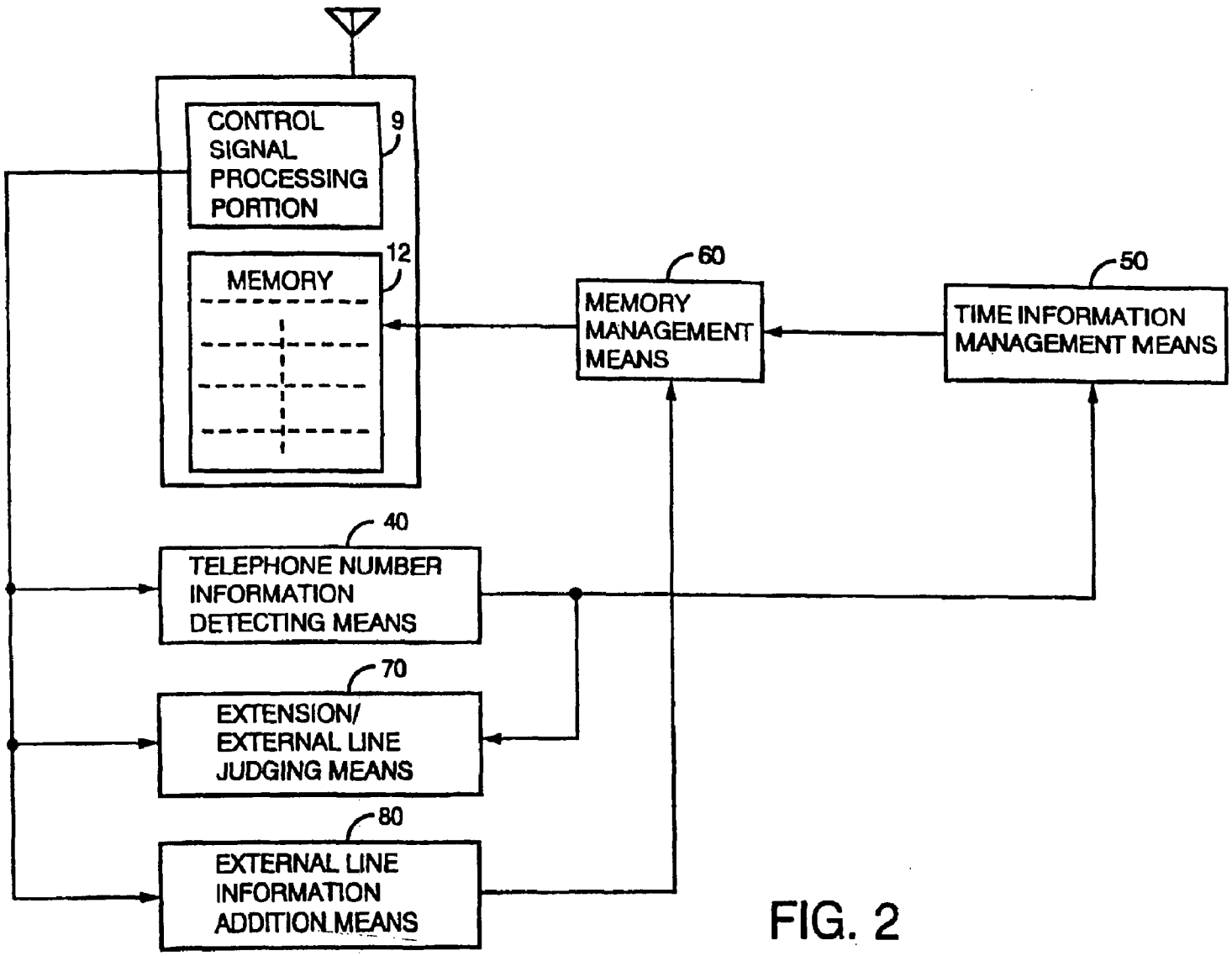
FIG. 2 is a functional block diagram related to a recording process of an incoming telephone number of the embodiment of the present invention shown in FIG. 1.

FIG. 2 is a functional block diagram especially relates to a recording process of the incoming telephone number conducted in the microcomputer 10 in the system configuration of the digital radio telephone shown in FIG. 1. FIG. 2 comprises a telephone number information detecting means 40 for detecting whether the telephone number information is included in the control information from the control signal processing portion 9, a time information management means 50 for specifying a receiving time of the control information included the telephone number information according to the time from a clock portion (not shown) provided in the digital radio telephone and for outputting the time information, an extension/external line judging means 70 for identifying and judging whether the call is from the extension or from the external line in case the telephone number information exists by detecting extension/external line identification information included in the control information for example, an external line information addition means 80 for extracting the telephone number information from the control information and for outputting the telephone number information in case the call is from the extension line, while for extracting the telephone number information from the control information, and adding external line calling information to the telephone number information, then, outputting the telephone number information as new telephone number information in case the call is from the external line, and a memory management means 60 for recording the telephone number information from the external line information addition means in the memory 12 as incoming record information in correspondence to the time information from the time information management means 50.

Figure 3:
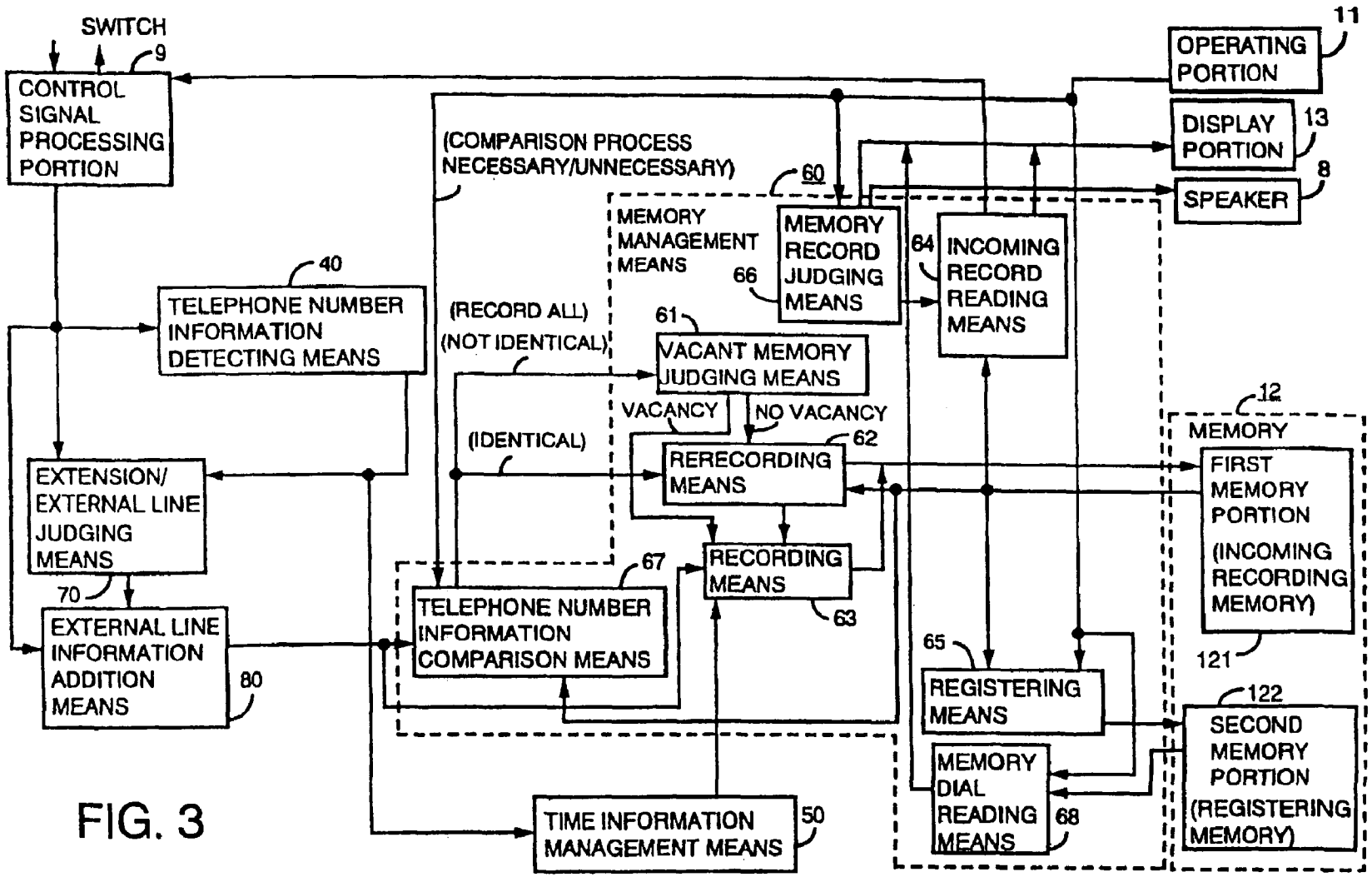
FIG. 3 is a block diagram related to a detailed process of a memory management means of the embodiment of the present invention shown in FIG. 2.

FIG. 3 is a functional block diagram especially relates to a detailed process conducted in the memory management means 60 shown in FIG. 1 which is the functional block diagram regarding the incoming telephone number process conducted in the microcomputer 10. In FIG. 3, a telephone number information comparison means 67 compares the telephone number information from the external line information addition means 80 with the telephone numbers previously recorded in the memory 12 and determines whether these telephone numbers are identical to each other. The operating portion 11 gives instructions to compare or not with the telephone number information. A vacant memory judging means 61 judges whether a vacant area exists in the memory 12 to store the telephone number information of a new incoming call according to an output of the telephone number information comparison means 67 ("record all" without comparison or "no identical information" as as result of comparison). A rerecording means 62 deletes unnecessary information (the oldest information or a plurality of identical information) of the incoming record information recorded in he memory 12 according to a judging result of the vacant memory judging means 61 ("no vacancy") or the output of the telephone number information comparison means 67 ("identical information" as a result of comparison) and keeps vacant areas to newly rerecord the remaining incoming record information A recording means 63 records the telephone number information in a desired area in the memory 12 in correspondence to time information as an incoming record information according to "vacant" as a judging result of the vacant memory judging means 61 or "vacant" as a judging result of the re-recording means 62.

Figure 4:
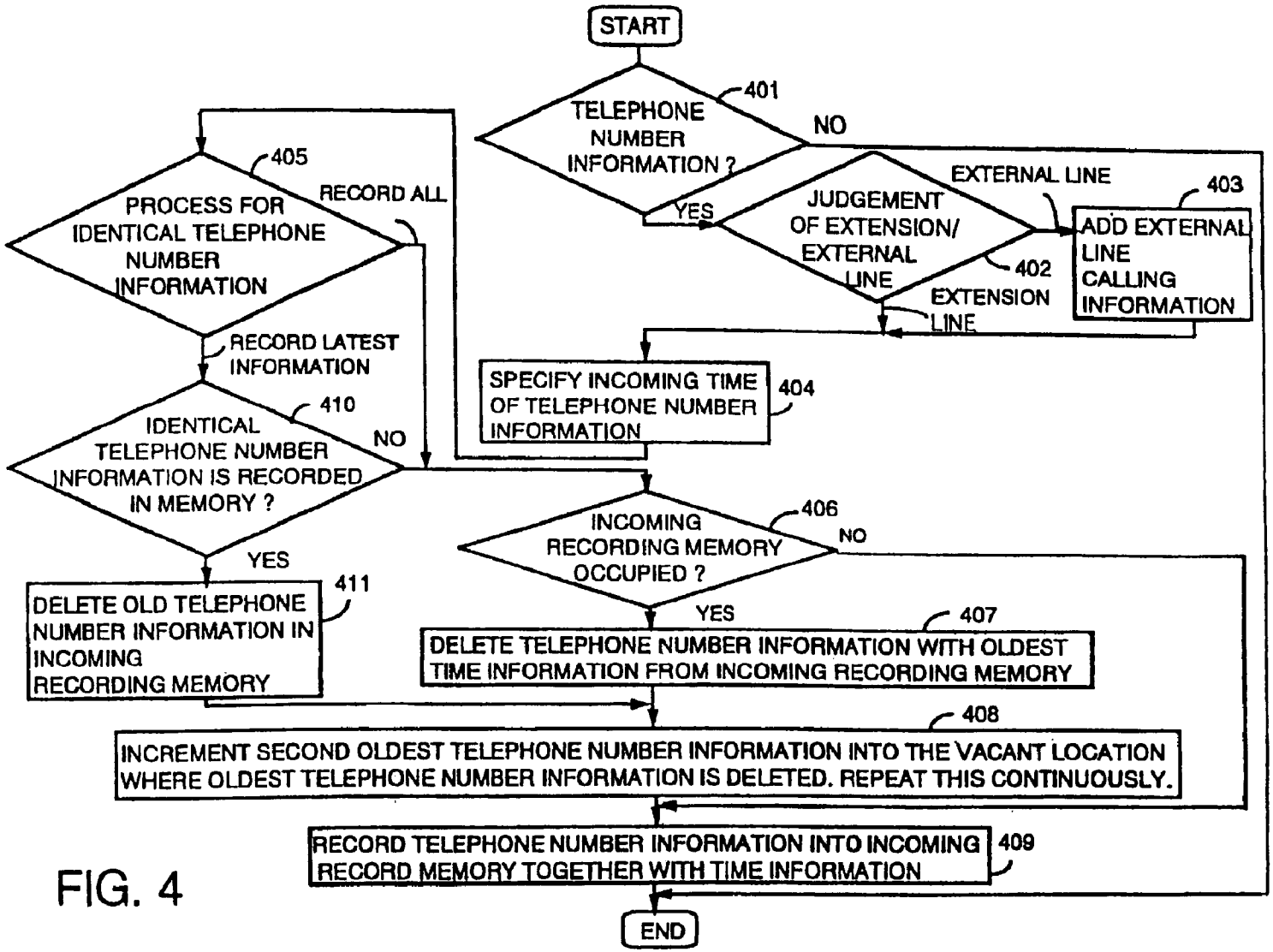
FIG. 4 is a flow chart related to the recording process of the incoming telephone number of the present invention.

FIG. 4 is a flow chart showing an operation of the recording process of the incoming telephone number. The operation of the present embodiment shown in FIG. 2 is explained using FIGS. 3 and 4.

First, in a step 401, the telephone number information detecting means 40 detects whether the telephone number information is included in the control information from the control signal processing portion 9. The process is completed in case the telephone number information is not included In case telephone number information is included, the extension/external line judging means 70 identifies and judges whether the telephone is in the extension or in the external line in a next step 402. In case the call is in the external line, in a next step 403, the eternal line information addition means 80 adds external line identifying information ("0" as the external line calling number, for example) to the telephone number information in the control information. In case the call is in the extension, the external line information adding means 80 extracts the telephone number information from the control information and outputs the telephone number information. Then, in a step 404, the time information management means 50 specifies the time when the telephone number information is received. In a next step 405, the operating portion 11 instructs the telephone number information comparison means 67 how to process incoming telephone numbers received. In the case where all incoming telephone numbers are to be recorded, the operation goes to step 406. In the case of where only the latest received incoming telephone number previously recorded is to be maintained in memory, the operation goes to a step 410. In the step 410, the telephone number information comparison manes 67 compares the recorded incoming telephone number information recorded in an incoming recording memory portion 121 of memory 12 with the latest incoming telephone number information. In the case where the incoming telephone number does not correspond to the registered telephone number information, the operation goes to the step 405. On the other hand, in the case where the incoming telephone number is identical to a telephone number already recorded in the registered telephone number information, the operation goes to step 411. In the step 411, the recording means 63 deletes the old telephone number information from the incoming recording memory 121 which matches the latest incoming telephone number, and goes to step 408. In the step 406, the vacant memory judging means 61 judges whether there is an area for new incoming telephone number information to be recorded in the incoming recording memory 121. In the case where the incoming recording memory 121 has a vacant storage area, the incoming telephone number information is recorded in the incoming recording memory 121 together with the time information. In the case where the incoming recording memory 121 is fully occupied, the operation goes to a next step 407, where the telephone number information with the oldest time information is deleted from the incoming recording memory 121. In the next step 408, the second oldest telephone number information is incremented and recorded into the location in the incoming recorded memory 121 where the oldest time information is deleted. This operation is repeated continuously. In a next step 409, the latest incoming telephone number information is finally recorded together with the time information into a location in the vacant incoming recording memory 121, and the operation is then completed. FIG. 5 shows a memory construction of the incoming telephone numbers and their incoming times in the incoming recording memory 121. As shown in FIG. 5, the respective incoming telephone number is stored in each address in combination with its incoming time in the incoming recording memory 121.

Figure 6:
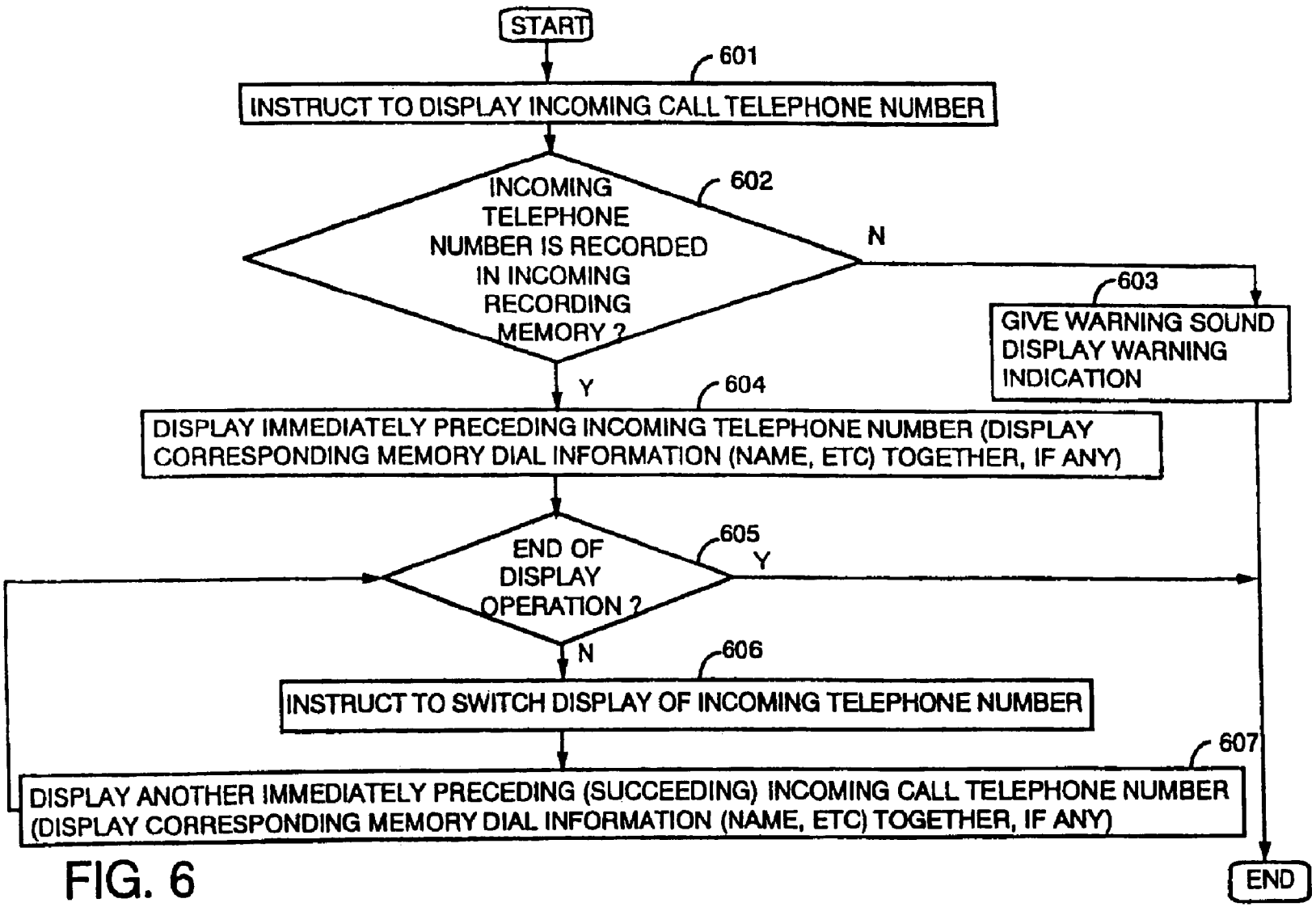
FIG. 6 is a flow chart related to a display process of the incoming telephone number of the present invention.

FIG. 6 is a flow chart shown an operation of display processes of the incoming telephone number recorded in the incoming recording memory 121. The operation of the display processes is explained below using FIGS. 3 and 6. First, in a step 601, the operating portion 11 instructs to display the recorded incoming telephone numbers. In a next step 602, a memory recorded judging means 66 judges whether incoming telephone number information is recorded so far into the incoming recording memory 121. In case no incoming telephone number information is recorded in a step 603, an indicating sound is given from the speaker 8 to inform the user that no incoming telephone number information is recorded and also an indicaiotn is displayed on the display portion 13 that no telephone number information is recorded, then, the display process is completed. In case where incoming telephone number information is recorded, an incoming record reading means 64 reads a recorded incoming telephone number received most recently together with its incoming time out of the incoming recording memory 121, and in a step 604, the display portion 13 displays the telephone number and the incoming time. In a next step 605, the display process finishes according to an instruction of the operating portion 11. In case of displaying other incoming telephone numbers, in a next step 606, the operating portion 11 instructs to switch the display indication of the incoming telephone number. In response to the instruction from the operation portion 11, in a step 607, the display of an immediately proceding incoming telephone number or an immediately succeeding incoming telephone number is switched back and forth. After that, the operation returns to the step 605, then, the steps 605, 606, 607 are repeated until a desired incoming telephone number is displayed.

Figure 7:
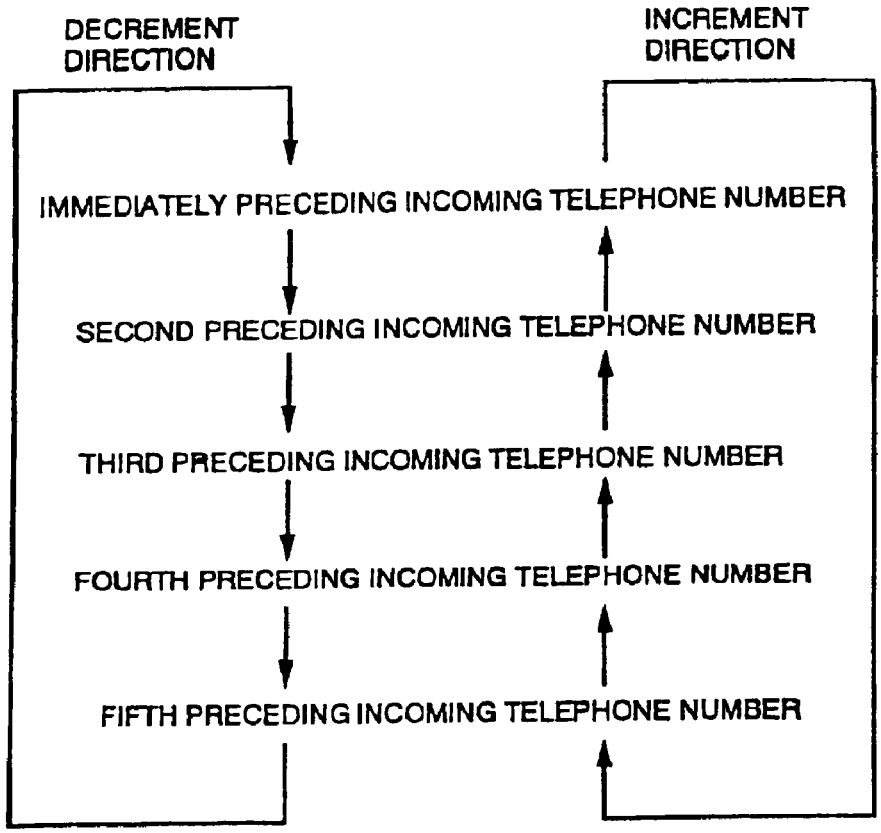
FIG. 7 shows a displaying order of the incoming telephone numbers in the present invention.

FIG. 7 shows a displaying order of the incoming telephone numbers when five incoming telephone numbers are recorded. According to the instructions from the operating portion 11, the displayed telephone number circulates in an increment direction or a decrement direction of the recorded incoming telephone numbers one after another. In the above mentioned display processes (steps 604, 607), only the incoming telephone number information and the incoming time recorded in the incoming recording memory 121 are displayed. In case memory dial information corresponding to the incoming telephone number information is registered in a registering memory 122 which is mentioned later, additional information (e.g. name or company name corresponding to the telephone number) in the memory dial information can be displayed as a related information at the same time in addition to the incoming telephone number information. In this case, in steps 604 and 607, the memory dial information in the registering memory 122 is searched (searching means is not shown) using a key word of the incoming telephone number which is read out by that incoming record reading means 64. Then, if the identical telephone number with the incoming telephone number is searched in the incoming record reading means 64, the additional information corresponding to the incoming telephone number is read out from the memory dial reading means 68 and displayed on the display portion 13.

Figure 8:
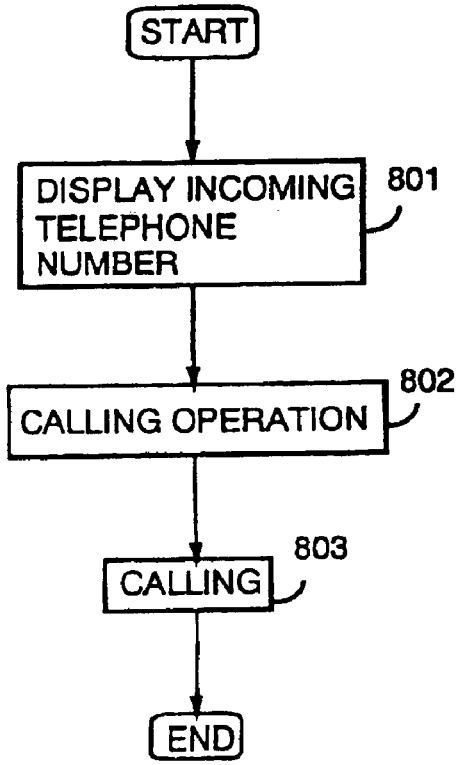
FIG. 8 is a flow chart related to an incoming redialing process of the incoming telephone number of the present invention.

FIG. 8 is a flow chart showing an operation of an incoming redialing process using the incoming telephone number recorded in the incoming recording memory 121. The operation of the incoming redialing process is explained below using FIGS. 3 and 8. First, in a step 801, the operating portion 11 instructs the display portion 13 to display a desired incoming telephone number. The detailed processes from the start to the display indication for displaying the incoming telephone number is the same as the display processes explained using FIG. 6. Next, in a step 802, the operating portion 11 instructs to carry out the incoming redialing. Then, in a next step 803, the telephone number information read out by the incoming record reading means 64 is transmitted as control information from the radio portion 5 to the mate telephone via the control signal processing portion 9 to make a telephone call.

Figures 9, 10:
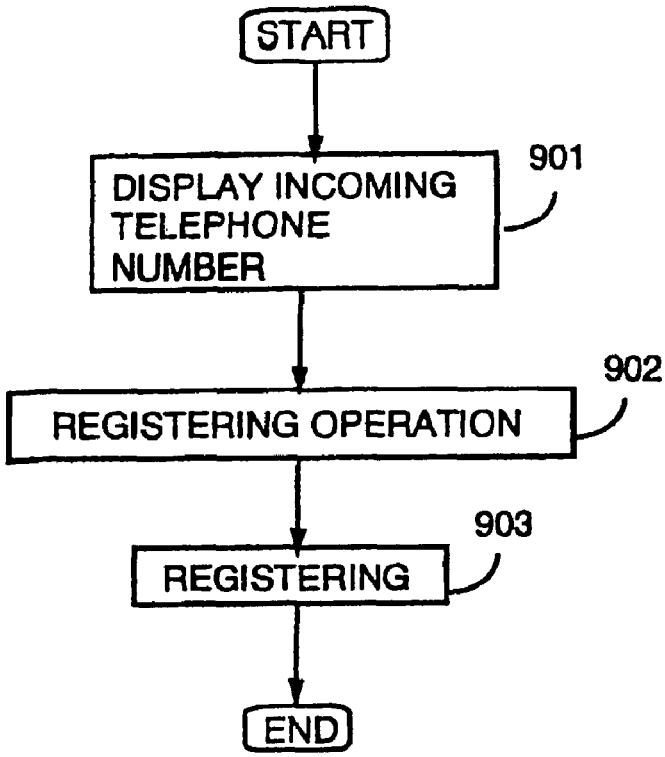
FIG. 9 is a flow chart related to a memory dial registering process of the incoming telephone number of the present invention.
FIG. 10 is a diagram to explain a storage construction of the telephone numbers in the memory dial registering memory of the present invention.
Figure 11:
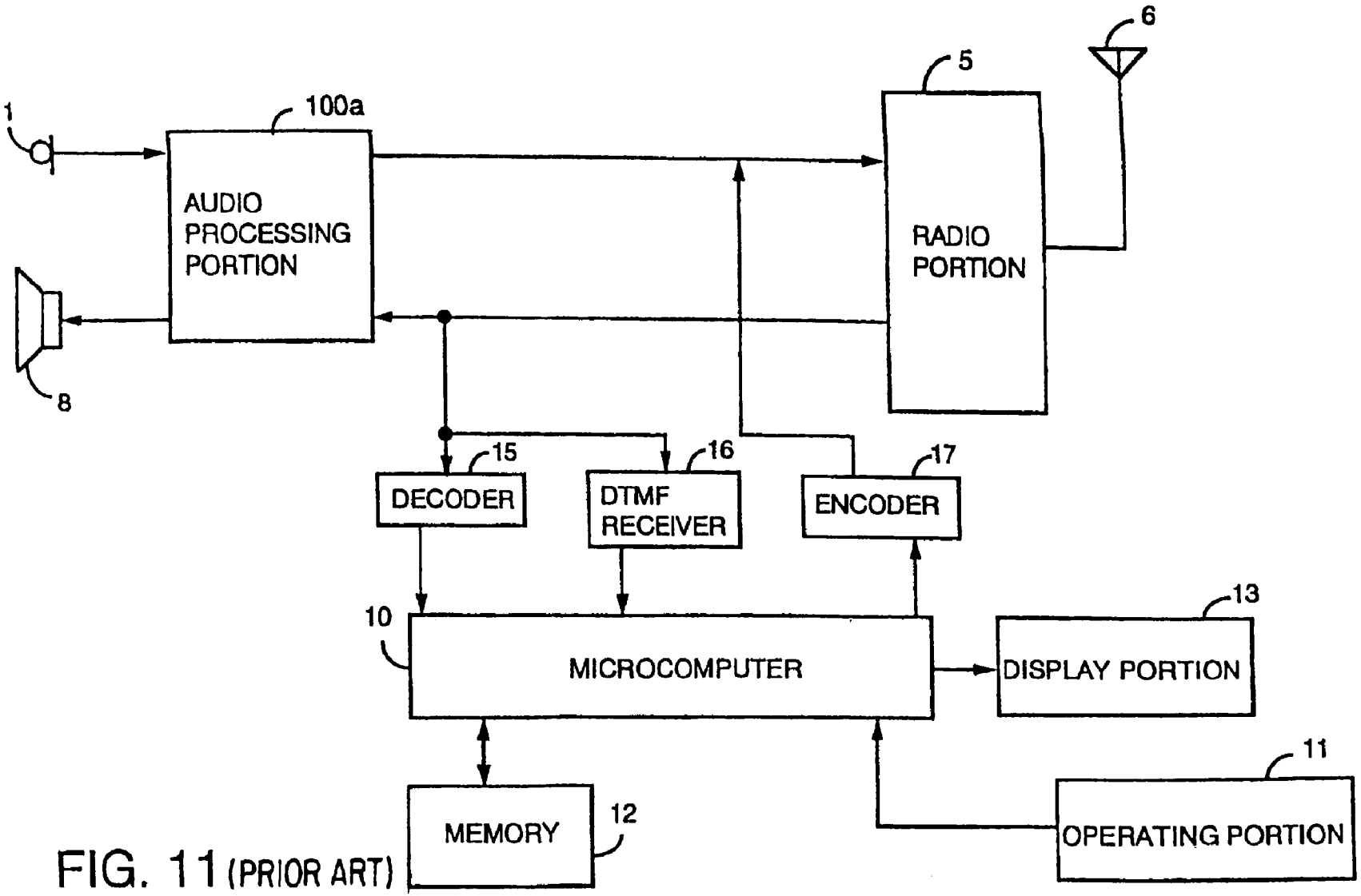
FIG. 11 (PRIOR ART)
FIG. 11 is a block diagram showing a system configuration of a conventional digital radio telephone.

FIG. 9 is a flow chart showing an operation of a memory dial registering process of the incoming telephone number recorded in the incoming recording memory 121. In general, a memory dial function includes functions for registering frequently-used telephone numbers and their related additional information (names, names of companies corresponding to the telephone numbers) in advance as memory dial information, for accessing a desired telephone number or additional information, for displaying it and for making a telephone call with less operations. The registering is explained using FIG. 3. First, a mate telephone number is inputted from the operating portion 11. Then, a registering means 65 registers the telephone number into a desired area in the registering memory 122 which is a second memory portion in the memory 12. At this time, it is possible to register the telephone number corresponding to an abbreviated title of the mate name and so on if required. FIG. 10 shows a storage construction of the mate telephone numbers and the related abbreviation of the mate names. As shown in FIG. 10, the telephone numbers are combined with the corresponding abbreviations and registered in respective addresses in the registering memory 122. An operation of the memory dial registering process of the present invention is explained below using FIGS. 3 and 9. First, in a step 901, a desired incoming telephone number is displayed on the display portion 13 according to the instructions of the operating portion 11. The detailed processes from the start to the display indication for displaying the incoming telephone number is the same as the display processes explained using FIG. 6. Then, in a step 902, the operating portion 11 instructs to register the memory dial. In a next step 903, the telephone number information read out by the incoming record reading means 64 is registered in a desired area in the registering memory 122, or the second memory portion, via the registering means 65.

What is claimed is:

[1. A digital radio telephone comprising:

a radio portion for receiving a radio signal modulated by an encoded digital signal including control information, for demodulating and outputting said encoded digital signal;

a control signal processing portion for decoding said demodulated encoded digital signal to obtain said control information;

a telephone number information detecting means for detecting, before a speech path is established with an incoming call apparatus, whether the decoded control information includes incoming telephone number information;

a memory for storing said telephone number information, said memory having an incoming recording memory and a registering memory, with said incoming recording memory storing a telephone number and a time information of an incoming telephone call;

a time information management means responsive to said telephone number information detecting means for specifying an incoming time of said telephone number information to output said time information; and a memory management means for recording said telephone number information corresponding to said time information into said memory, with said telephone number being compared to previously stored telephone numbers, and being stored in a first memory location if said telephone number is not in said incoming recording memory, and being deleted from an existing memory location and being stored in a first memory location if said telephone number is currently in said incoming recording memory.]

[2. The digital radio telephone of claim 1, further comprising:

an identification information memory for storing identification information corresponding to said telephone number information stored in the memory.]

*3. A digital radio telephone, comprising;*

*a radio device configured to receive a radio signal modulated by an encoded digital signal including control information, to demodulate said radio signal, and to output said encoded digital signal;*

*a control signal processor configured to decode said demodulated encoded digital signal to obtain said control information;*

*a telephone number information detector configured to detect, before a speech path is established with an incoming call apparatus, incoming telephone number information included in said control information;*

*an incoming call memory configured to store incoming telephone number information corresponding to a plurality of incoming calls;*

*a display portion configured to display information based on said telephone number information; and*

*a registration memory configured to store a telephone number information and additional information related to said telephone number information;*

*an operation portion for generating an operation signal which instructs display by said display and enables registration of telephone number information in said registration memory; wherein*

*said display portion in accordance with the operation signal is configured to display at least said additional information when received telephone number information is the same as previously stored telephone number information, and*

*said display portion is configured to display a plurality of telephone number information stored in said incoming call memory when received telephone number information is not the same as previously stored telephone number information, and in accordance with the operation signal, said registration memory is enabled for registration of the received and displayed telephone number information in said registration memory.*

*4. The digital radiotelephone according to claim 3, further comprising:*

*a time information management device configured to output incoming time information which corresponds to the telephone number information detected by said telephone number information detector, wherein*

*said incoming call memory is further configured to store said incoming time information.*

*5. The digital radio telephone according to claim 4, wherein said incoming call memory is configured to store said incoming telephone number information starting from telephone number information which has been received most recently.*

*6. The digital radio telephone according to claim 4, wherein said incoming memory is configured to replace a previously stored telephone number information with telephone number information that has been received most recently from an identical telephone number.*

*7. The digital radio telephone according to claim 3, wherein the operation portion is configured to generate another operation signal which instructs a calling process in accordance with telephone number information of information which is displayed on said display portion.*

*8. The digital radio telephone according to claim 3, wherein, writing control of an information set which corresponds to said detected telephone number information is carried out to said incoming call memory on the basis of a vacant condition of a storage area of the incoming call memory or whether telephone number information, which was detected by the telephone number information detector, is included in said incoming recording memory.*

*9. The digital radio telephone according to claim 3, wherein the incoming call memory is further configured not to record data when telephone number information is not included in said control information.*

* * * * *